United States Patent Office 2,915,369
Patented Dec. 1, 1959

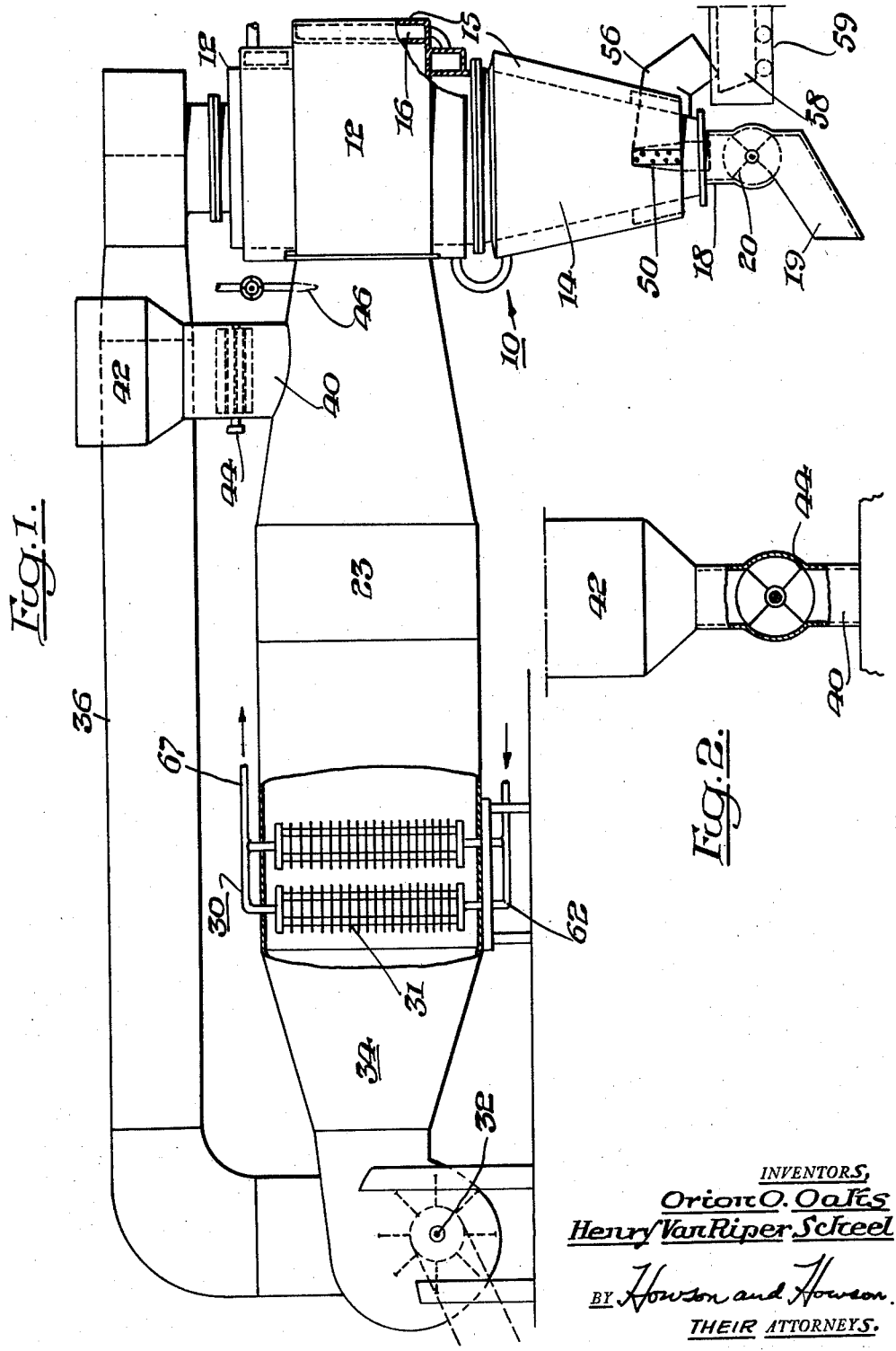

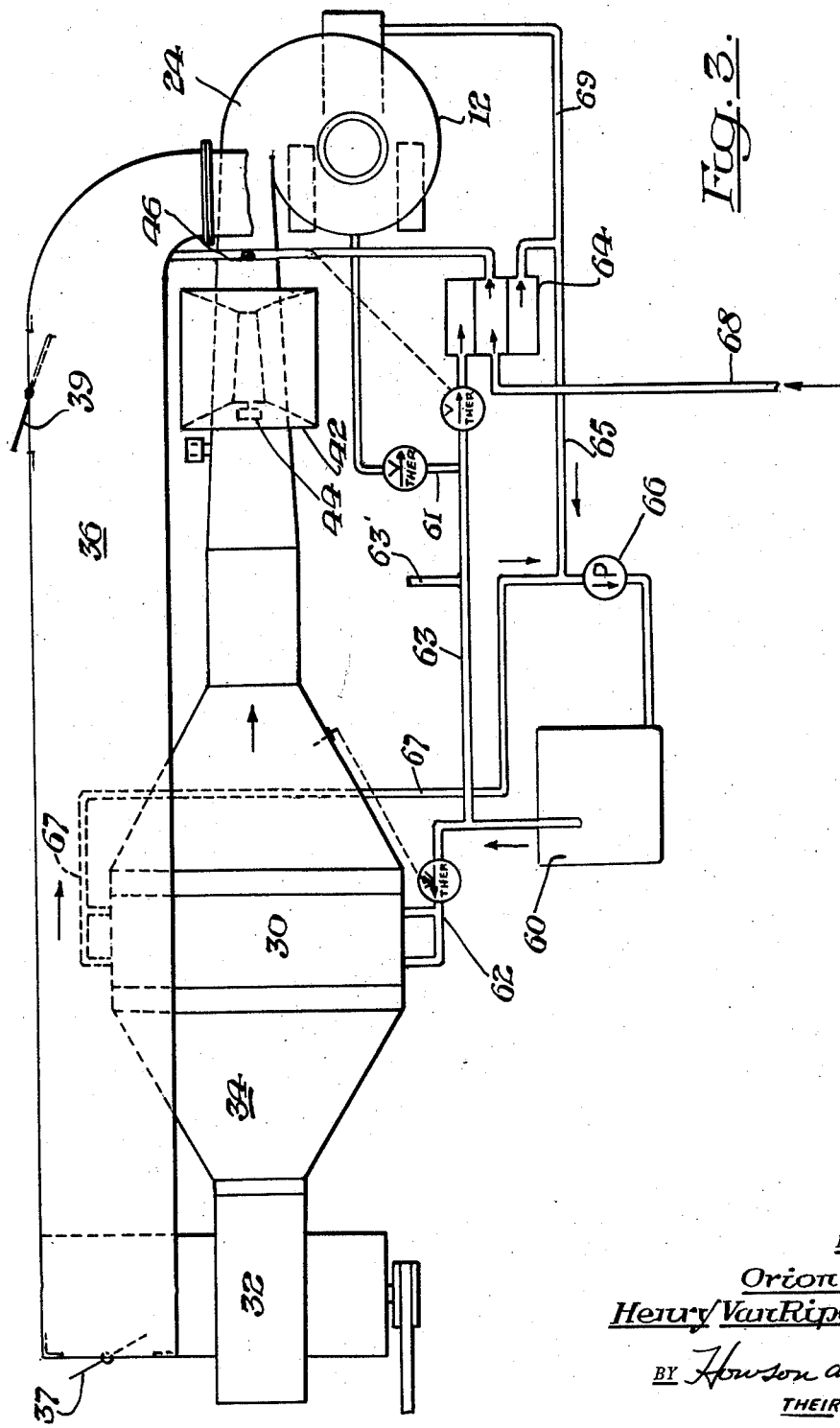

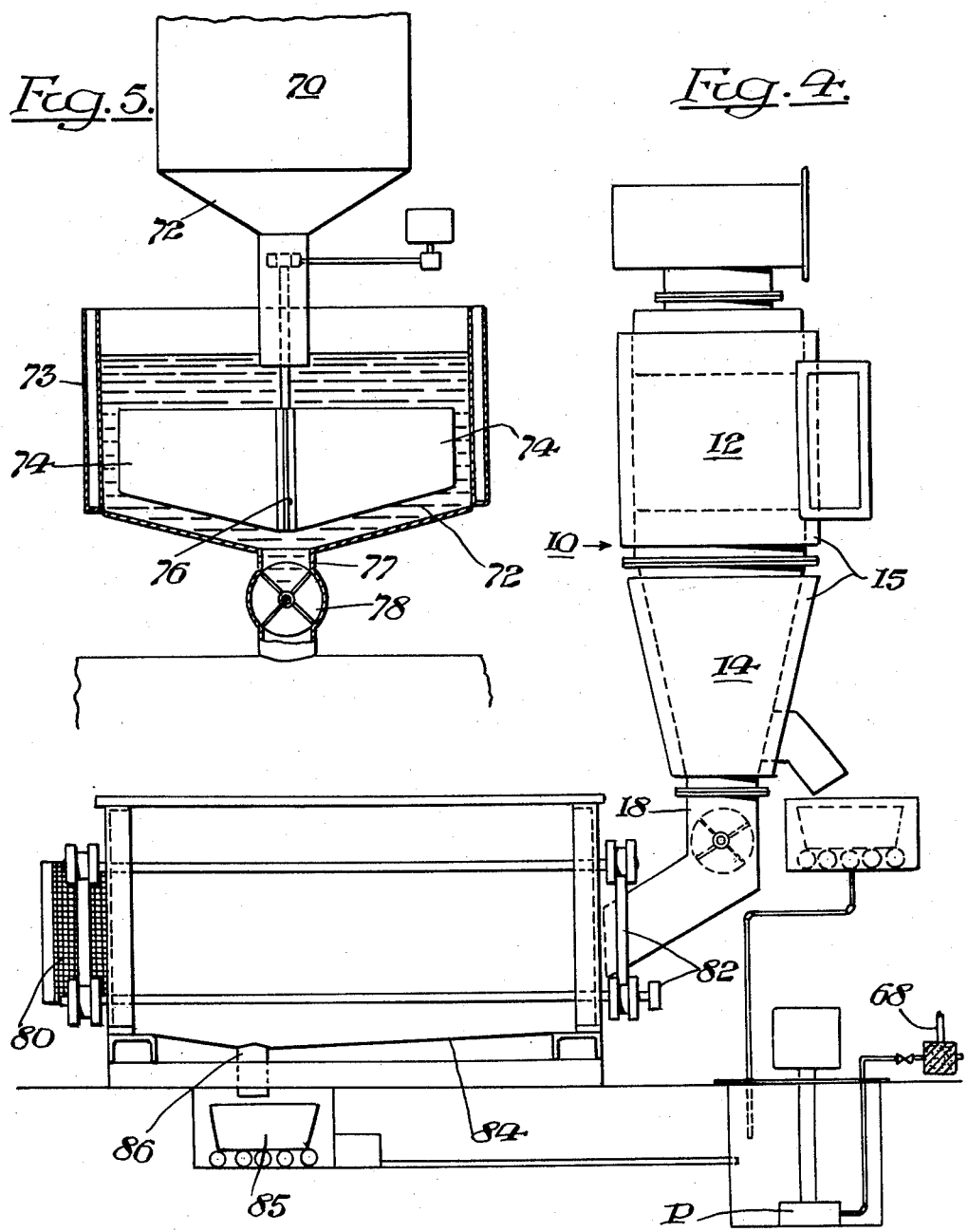

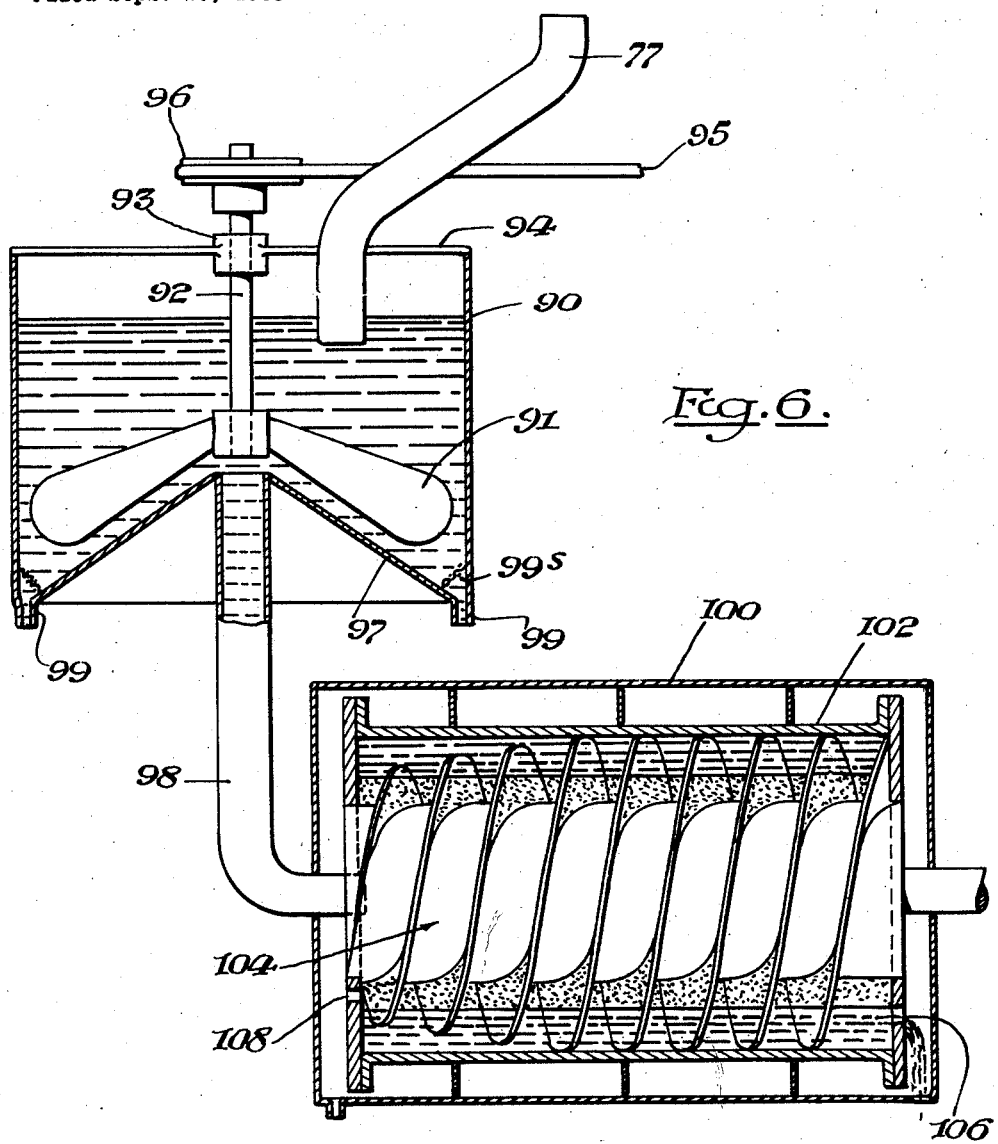

2,915,369

PROCESS FOR EXTRACTING SULPHUR

Orion O. Oaks, Summit, N.J., and Henry Van Riper Scheel, New York, N.Y.

Application September 29, 1953, Serial No. 383,084

5 Claims. (Cl. 23—308)

This invention relates to a continuous process for extraction of sulphur from sulphur bearing materials. It is particularly useful in treating materials wherein the sulphur occurs naturally in a free or chemically uncombined state but advantages of the process may be availed of (in whole or in part) in the treatment of materials bearing sulphur in chemically combined form, after the chemical bonds have been released.

Heretofore such methods as have been used for extracting sulphur, for example from volcanic ore and similar ores, have been expensive and wasteful. In general they could not effectively compete on an equal and practical basis commercially with processes for extracting sulphur from other deposits where it occurs in uncombined form.

Proposals for extraction of sulphur from volcanic ore involves use of fluids which in high altitudes where the ore is often found would volatilize and become lost. Such waste increases to a prohibitive extent the cost of the process using such volatile materials, so that plants attempting to use those materials have become marginal producers or commercially impractical.

Therefore it is an object of this invention to provide a new, economical and efficient process and apparatus for extracting sulphur from sulphur bearing materials.

A related object is to provide such a process and apparatus which will be particularly useful in the extraction of sulphur from ores or materials in which it occurs naturally in a chemically uncombined or free state.

Another object is to provide a process and apparatus of the above mentioned type involving materials, no considerable part of which will be lost but which on the contrary can be recovered and recycled or used elsewhere in the process or apparatus to good effect.

Another object is to provide a process, as aforementioned, in which a liquid vehicle may be employed when desired to improve the operation of the process and apparatus.

Another object is to provide a process of the aforesaid type in which the apparatus necessary to carry it out will not involve prohibitive capital expenditures, massive equipment, expensive processing materials, nor unduly large power requirements.

Another object is to provide a novel process and apparatus of the above type which involves minimum loss of heat due to recovery and reuse of heated fluids and materials.

Another object is to provide a novel process for extracting sulphur from volcanic ore and the like by centrifugal separation such as in a cyclone or dynamic separator; and a related object is to provide a simple modified form of cyclone separator suited to the process.

Other objects and advantages of the invention will become apparent as it is described in connection with the accompanying drawings.

In the drawings:

Fig. 1 is a side elevational view of apparatus for carrying out the invention.

Fig. 2 is a detail view in end elevation and partly in section of the device for introducing the ore into the apparatus.

Fig. 3 is a plan view of apparatus embodying the invention.

Fig. 4 is an end elevation of an apparatus embodying the invention.

Fig. 5 is an elevational view, partly in section, of a modification useful in connection with the forms illustrated in Figs. 1 to 4 and 6.

Fig. 6 is an elevation view shown in vertical section of another form of the invention.

It will be understood that wherever reference is made herein to ore, we include any material which contains sulphur in a free or chemically uncombined state, naturally or otherwise, or in which (if chemically bound) the chemical bonds have been released to such an extent that the material may be fed into the process and apparatus and sulphur recovered thereby.

In general terms the process comprises feeding finely divided sulphur bearing material into a high-speed stream of hot air entering a conventional type of centrifugal or cyclone separator modified for the requirements of present use; injecting into the material at its feed point a hot liquid (if desired) to act as a carrier or vehicle, or previously soaking the material with the liquid, the hot air and liquid raising the temperature of the material somewhat and also imparting centrifugal action to the ore and liquid; and, as the material together with the added hot liquid or vehicle move outward to the walls of the cyclone, which are kept hot, the sulphur, becoming liquefied, is drawn off while the gangue or tailings are discharged through the bottom of the separator. The added liquid is of the type that does not form a solution nor chemically combine with the sulphur or other ingredients present in the ore and is stable at the temperatures of use in the process and has a different specific gravity than sulphur so that the sulphur and added liquid separate as the sulphur is poured into forms. There, the sulphur being heavier will sink to the bottom of the form while the liquid vehicle flows off. The added liquid thus acts somewhat like a catalyst, in the respect that it can be recovered and reused practically unchanged at the end of the action. Thus, the liquid may for convenience of terminology be referred to as a quasi-catalyst.

In an alternate form not employing a moving stream of gas as the means of causing centrifugal action, the liquid-soaked ore, heated above the melting point of sulphur is centrifuged in a continuously operating centrifugal machine from which the sulphur and liquid vehicle are drawn off as liquids separate from the solids.

Referring to the drawing, a cyclone centrifugal separator, designated generally by the numeral 10, comprises a chamber having an upper cylindrical portion 12 with a volute entrance passage 24 and a conical lower portion 14 terminating at the bottom in a vertical outlet passage or large pipe 18. The upper and lower chambers 12 and 14 of the cyclone may each have a jacket or outer wall 15 spaced from the inner wall providing a space 16 through which hot liquid may circulate to heat the walls of the cyclone chamber.

In the outlet passage 18 is a rotating valve of conventional form which discharges the gangue without opening the cyclone chamber to atmospheric pressure. It comprises a plurality of radial rotating vanes 20, the pockets between which fill up at the top of the rotation. As the valve rotates, the vanes maintain closed the passage from the chamber 14 to the atmosphere while the pockets carry around to the discharge chute 19 successive small portions of the gangue accumulating in the bottom of chamber 14.

Centrifugal action upon the material introduced into the cyclone chamber 12 is produced by projecting a stream of air tangentially into the chamber through a horizontal volute inlet passage or conduit 24 connecting with the chamber 12.

In order to propel the air into the chamber, the inlet passage leads through a large horizontal conduit 23 from a blower and heater combination. The heater 30 may comprise a conventional arrangement of heat transfer surfaces such as finned tubes 31 or a nest of heating tubes. The form, size and number of tubes will depend on the desired amount and rate of heat transfer. A blower 32 of standard squirrel cage or other suitable type delivers air under pressure to the heater through a conduit or passage 34.

To conserve heat the hot spent air from the chamber 10 is drawn through a connecting conduit 36 to the intake of the blower 32. There is provision however for adding and mixing fresh air to the delivery to the blower so that the circulating air is maintained above its dew point. For that purpose a weighted or spring biased damper 37 is provided in the conduit 36 near the blower to admit fresh air as oppositely operating damper 39 at the other end of the conduit 36 permits the discharge of wet hot air.

Assuming for the purpose of description volcanic sulphur bearing ore is to be treated, the ore is introduced in a finely divided condition into the moving stream of hot air near the point where it enters the cyclone. At this point the air may be moving at about 3250 feet per minute or in the neighborhood of that speed. For the purpose of delivering the ore into the air stream, a delivery port 40 is provided below a hopper 42. The amount of ore fed may be controlled by a rotary valve 44 in the ore delivery port similar to valve 20 previously described, so that ore may be fed into the moving air stream without opening the passage to atmospheric pressure.

At the point of entrance of the ore there is mixed with it a liquid vehicle which is introduced (under pressure if desired) through a nozzle 46 so as to mix with the ore being blown into the cyclone. The liquid may be any one of the class of liquids which is stable and will not react with sulphur at the temperatures and conditions of use prevailing in the apparatus and process and will not evaporate or burn or volatilize readily at the temperatures and pressures of the process when carried out at high altitudes. Examples of such liquids are lubricating oils, light fuel oils such as Nos. 1, 2 and 4, heat transfer oils such as Esstic (trade name) which are stable up to about 400° F. It will be understood that when reference is made herein to oil, any of those oils or any liquid of equivalent properties are included, since the invention is not limited to any particular oil.

The ore, lump-pumice, as quarried is a porous stone-like material. It may consist of silicious grains or granules held together by cement-like solid sulphur. When heated, especially within a mass of oil, or equivalent liquid, the differences in the volumetric expansion rates of the sulphur, of the gangue material, and of the oil, become effective in a sort of shattering of the solid. Also the oil, being a penetrant, acts to lower the interfacial tensions between the sulphur and the matrix. After separation, each of the component materials settles out in order of their specific gravity: sulphur, gangue and oil. The presence of the hot liquid in intimate contact with the particles of ore, accelerates the rate of heat-transfer to the sulphur, the liquid being a better conductor of heat than is a gas like air.

The ore used in the process may be of a fineness to pass through a 80 mesh screen, more or less.

In carrying out the process, air heated by passing through the heater 30 enters the hot cyclone at about 300° F. with the oil or liquid mixture. The oil and ore are thus heated to between 235° F. and 265° F. in which range it is preferred to work because in that range sulphur is liquid and free flowing. At about 300° F. the sulphur tends to become dark and viscous; hence it is necessary to operate below that range.

The mixture entering tangentially whirls at tornado like velocities rotatively in the cyclone chamber with attendant high centrifugal effects to separate the liquid from the solids and from each other and works down toward the conical bottom. The frequent impingements of unresolved particles upon the heated walls of the cyclone separator results in reduced particle size and in heating of the sulphur above its critical limit (235° F.) As a result a slurry is formed of ore, sulphur and gangue, each as such.

As the mixture moves around the conical portion 14, the liquid sulphur and vehicle are drawn off centrifugally. For that purpose the conical portion 14 is provided with screening means comprising a series of holes or perforations in the spaced, upwardly and downwardly extending areas 50, in the wall of the cone which are perforated with small holes. Two or more of said areas may be provided depending on the requirements of the particular installation. The areas may be about ½ inch wide and extend about ¼ of the distance up the conical portion 14. These screening areas present no impediment to the rotary movement of the mixture over the wall yet permit the liquid sulphur and vehicle to pass off while he gangue or non-sulphur is retained and works its way down to the discharge outlet at the bottom. The presence of the oil vehicle in the heated mixture has a great influence in causing the melted sulphur to leave its matrix.

The liquid drawn off through the screening areas is delivered to one or more pipes 56 connected thereto. The drawn-off liquid comprising a combination of sulphur and vehicle is delivered to molds 58 wherein the sulphur being heavier sinks to the bottom displacing the liquid vehicle which overflows and is caught in a reservoir 59. The sulphur cools and solidifies, while the hot liquid can be reused, with or without filtering.

Thus the heat of the air, employed to heat and introduce the ore to the cyclone, is conserved by returning it to the blower intake, while the heat of the liouid vehicle is conserved by reuse.

Any suitable means can be employed to maintain the air heater 30 at the desired temperature, since the invention is not limited to any particular means. One particularly suitable means includes the use of a liquid which does not boil or vaporize at the temperatures contemplated such as "liquid heat" (tetra cresyl silicate) which is heated in a suitable boiler (diagrammatically shown) at 60 and conducted to the heater 30. From the boiler the "liquid heat" is led by a pipe 62 to the air heater 30 and by a branch pipe 63 to a conventional heat transfer device 64 for the liquid vehicle before introduction to the hot air stream. And by a branch pipe 61 from pipe 63 to the jackets on the cyclone. Heat for other parts or jackets in the apparatus may be fed by another branch 63' from pipe 63. From the heat transfer device the "liquid heat" returns through pipe 65 which joins with the return line 67 from the air heater. The return pipe 69 from the cyclone jackets joins the return pipe 65. Then the liquid from all return pipes enters a pump 66. The "liquid heat" from both the heat transfer device 64 and air heater 30 is fed back to the boiler 60 by the pump.

Oil from the supply or reclaimed after separation from the sulphur may be fed to the heat transfer device 64 through pipe 68 and from the heat transfer device to the nozzle 46.

In the foregoing, provisions have been described for introducing the liquid vehicle and ore or other material in a fluent condition, separately.

Instead of introducing them separately, ore in a fluent condition may be fed (see Fig. 5) to a soak tank 70 having a convex or conical bottom 72. The tank contains the liquid vehicle and the ore is fed in below the liquid level. To intimately mix the liquid and ore in the soak tank, a rotating agitator may be coaxially mounted in the tank having several radial blades 74 extending from its shaft 76. The mixture of liquid soaked ore may be delivered from the soak tank into the hot air stream through a discharge duct 77 issuing from the center of the bottom of the soak tank. A power driven rotating valve 78 is provided in the discharge duct 77 similar in nature to the valve 44 in that small portions of the mixture are delivered from the soak tank as the valve rotates, without permitting access of atmospheric pressure to the hot air stream. Alternatively, the mixture may be delivered from the soak tank into the hopper 42 (Figs. 1 and 2) in which case liquid vehicle need not necessarily be introduced through the nozzle 46 if enough is already present.

The soak tank has an outer shell providing or circulating hot liquid around the walls of the tank to keep the walls hot. "Liquid heat" or other suitable liquid medium may be employed at a temperature between the boiling point of water and 235° F., the critical melting temperature of sulphur. By keeping the temperature of the tank contents above the boiling point of water, moisture is driven off before the material enters the hot air stream. Any suitable means may be provided to keep the oxygen content low in the space above the tank contents so as to avoid the possibility of a flash-over if any vapors should become heated above the flash-point. For example, the space may be kept filled with incombustible flue gases, or the vapors may be led off through a condenser, or both.

As the hot mixture from the soak tank enters the hot air stream, its temperature rises enabling the sulphur to separate from the gangue with the result that sulphur, liquid and gangue can be separated in the cyclone separator.

In some circumstances subsequent treatment of the gangue from the discharge chute 19 may be useful. For that purpose a slowly revolving horizontal cylindrical screen 80 turned by suitable conventional gearing 82 from a motor (not shown) is provided to separate the gangue from still hot liquid adhering thereto. The liquid flows off by gravity into a collecting pan 84 beneath the screen 80 while the gangue flows in one end and out the other of the revolving screen. Any small amount of liquid sulphur still remaining in the gangue will flow out with the hot liquid and can be collected in a mold 85 as the oil and sulphur flow from a discharge pipe 86 in the bottom of the collecting pan. Oil or other liquid overflowing the mold is pumped back by a sump pump P to the entrance pipe 68 of the heat exchanger 64, where it is mingled with hot liquid from the supply entering the exchanger.

In Fig. 6 apparatus showing a variation in the process is illustrated. Liquid-soaked ore comes down through the conduit 77 from a soak tank of the type illustrated in Fig. 5. In that soak tank it will be recalled the ore and liquid were mixed and stirred. The mixture was heated in order to achieve better mixing. However, the heating is only to a temperature less than sufficient to melt the sulphur in the soak tank.

The soaked mixture from the discharge conduit 77 is delivered to a cylindrical melting tank 90 in which is mounted a rotary agitator having blades 91 rotated by an axle 92 mounted coaxially in the tank 90 in any suitable fashion, as in bearing 93 by supporting arms 94 radially extending inward from the inside walls of the tank. The agitator is driven slowly by a motor (not shown) through a belt and pulley 95, 96 or in any other suitable fashion. The soaked ore enters the tank 90 below the liquid level.

The bottom 97 of the tank 90 is preferably of concave conical form having a discharge conduit 98 coaxially joined to the bottom at its apex.

The wall of the melting tank 90 is jacketed in a similar manner to that in the previously described forms of the invention in order that hot liquid may be circulated preferably at a temperature of 260° F. in the jacket. Thus the mixture in the melting tank will become heated. It will be understood that additional oil or equivalent liquid is fed continuously to the melting and soak tanks as additional ore is continuously added. Thus by proper regulation, the process may be continuously operated.

Since the heating in the melting tank is to a temperature which will cause sulphur to melt and since the sulphur has the highest specific gravity of any of the ingredients in the oil and ore mixture, the sulphur tends to sink to the bottom of the agitator tank and to collect in a puddle adjacent the joint of the conical bottom and the side wall. This liquid sulphur may be drawn off through several discharge outlets 99 located adjacent the joint between the conical bottom and side wall of the agitator tank. In order to prevent the solid material from also passing out through these outlets, an inclined annular screen 99s may be seated and secured adjacent the joint between the conical bottom and the side walls just above the outlets 99.

The soaked ore leaving the melting tank 90 through the conduit 98 is fed to a horizontal separator. This separator is of a type known and commercially available on the market and therefore need only be described briefly. It comprises an outer casing or shell 100 within which is supported on precision bearings a rotating cylinder 102 which is closed at its ends except for the openings hereinafter mentioned. Within the rotating cylinder 102 is a scroll conveyor 104 which rotates in the same direction but at a different speed than the cylinder 102. Both the scroll conveyor 104 and the cylinder 102 are supported on precision bearings and are rotated at high speed by a motor (not shown) through suitable gearing which causes the cylinder and scroll conveyor to operate at a desired difference in speeds.

As material enters axially into the horizontal separator, it is moved by centrifugal force toward the periphery of the rapidly rotating cylinder 102, the heavier materials and liquids being caused to form a layer nearest the periphery while the lighter materials form separate layers radially inward in known manner of operation in centrifugal devices. The liquid material is drawn off through a port or opening 106 in one end while the solid material is moved by the scroll conveyor toward an opening or port 108 in the other end of the rotated cylinder and is discharged separately from the liquid.

In the form described in connection with Fig. 6, as in the previously described forms, the mixture of hot liquid and ore is in such proportions that the mixture is of a slushy consistency. It has been found that if less liquid is used, the mixture tends to ball up and the operation of the process is unsatisfactory. In connection with the form in Fig. 6, it may be necessary however to use a mixture that is even more fluid and has a larger proportion of liquid vehicle than in the other forms.

In some instances, the ore may be so rich in sulphur and the heating in the melting tank may be so effective that a large portion of the sulphur is removed by the action which takes place in the melting tank. In that event, and also in some other circumstances, it may be unnecessary to use the centrifugal type of horizontal separator illustrated in Fig. 6. Instead a revolving screen of the sort illustrated in Fig. 4 may be used. In that case, the soaked and hot mixture flowing in the conduit 98 from the melting tank may enter the rotating screen in the same manner as the material discharged through the discharge conduit 18 in Fig. 4 into one end of the rotating screen. The collection of the sulphur and discharge of the gangue or tailings can be the same as described in connection with Fig. 4.

Although the use of a liquid vehicle is preferable, in some cases it may be unnecessary or undesirable. The process will operate without the vehicle by reason of the fact that sulphur between the liquefaction temperature and about 300° F. flows like water, and hence may be discharged in the manner described in the absence of the liquid vehicle.

From the foregoing it will be observed that the invention provides a novel and efficient process for the separation of sulphur from sulphur bearing materials, and is particularly suited to treatment in volcanic ore or in ore which contains sulphur in free or chemically uncombined state. It also avoids waste of the liquid vehicle since it is recovered and returned to the process readily for reuse; and when the liquid is oil, the residue still adhering to the gangue at the end of the separating process could be burned and its heat utilized for heating the "liquid heat."

The process permits accurate control of the temperatures at the different stages in the process through the use of "liquid heat."

"Liquid heat," being a liquid that does not freeze even at temperatures well below those encountered in the use of this invention nor boil at temperatures well above those contemplated here, and remaining fluid and non-volatile throughout the range, is admirably adapted to accurate temperature control in this process. By varying its temperature or rate of flow or both, the amount of heat transfer is easily controlled through known thermostatic valves, pumps and automatic devices. Since the amount of heat transferred through the various jackets and in the heat transfer devices is the important factor, the process may be readily adapted to conditions of practical use with the necessary degree of accuracy.

Many modifications within the scope of the invention will occur to those skilled in the art. Therefore, the invention is not limited to the embodiment specifically described and illustrated.

What is claimed is:

1. A sulphur extraction process comprising introducing a free-sulphur-bearing material in fluent condition and a liquid vehicle into a hot rapidly moving stream of gas, said liquid vehicle having a different specific gravity than sulphur and at the temperatures and pressures used in the process being stable and non-volatile and non-reactant chemically with sulphur, subjecting the ore and liquid-vehicle-mixture to centrifugal force in a rapidly rotating stream of said hot gas whereby the sulphur is liquefied and separated from the solids, and drawing off the liquid sulphur and liquid vehicle separately from the solids.

2. A sulphur extraction process comprising mixing a free-sulphur-bearing material in fluent condition with a liquid vehicle having a different specific gravity than sulphur and which at the temperatures and pressures used in said process is stable and does not react chemically with sulphur nor volatilize, heating the mixture at least to the liquefaction point of sulphur but below the point at which it ceases to be a free-flowing liquid, subjecting the liquefied mixture to centrifugal force in a hot gaseous rapidly rotating stream to cause separation of the liquids from the solids, drawing off the liquids separate from the solids, and segregating the liquid sulphur from the liquid vehicle.

3. A sulphur extraction process comprising mixing a free-sulphur-bearing material in fluent condition with a liquid vehicle having a different specific gravity than sulphur and which at the temperatures and pressures used in said process is stable and does not react chemically with sulphur nor volatilize, subjecting the mixture to centrifugal force in a hot gaseous rapidly rotating stream to liquefy the sulphur and to cause it to separate from the solids of the material, drawing off the liquids separately from the solids and segregating the liquid sulphur from the liquid vehicle.

4. A sulphur extraction process for ore containing free sulphur comprising introducing into a high-speed stream of hot gas a slushy heated mixture of ore and a liquid vehicle of less specific gravity than sulphur and which at the temperatures and pressures used in said process is stable and does not react chemically with sulphur nor volatilize, subjecting the mixture to centrifugal action in a cyclonically rotating stream of said hot gas to further heat said mixture to liquefaction temperature of sulphur but below the point at which it ceases to be a free-flowing liquid and to separate the liquids from the solids, drawing off the liquids, and segregating the liquid vehicle from the liquid sulphur.

5. The process as claimed in claim 1 wherein the solids drawn off by the centrifugal separating are subjected thereafter to a tumbling action while still above the melting point of sulphur to drain off residual liquid therefrom, collecting the drainings separate from the residual solids, and segregating the liquid sulphur from the liquid vehicle.

References Cited in the file of this patent

UNITED STATES PATENTS

| | | |
|---|---|---|
| 473,662 | Haeckler | Apr. 26, 1892 |
| 938,702 | Porbeck | Nov. 2, 1909 |
| 1,285,358 | Perry | Nov. 19, 1918 |
| 1,318,015 | Sedgwick | Oct. 7, 1919 |
| 1,374,422 | Bragg | Apr. 12, 1921 |
| 1,406,905 | Sedgwick | Feb. 14, 1922 |
| 1,409,338 | Fenton | Mar. 14, 1922 |
| 1,512,320 | Thornton | Oct. 21, 1924 |
| 1,990,602 | Guernsey et al. | Feb. 12, 1935 |
| 2,195,870 | Rosen | Apr. 2, 1940 |
| 2,409,408 | Tweedale | Oct. 15, 1946 |
| 2,537,842 | McGauley et al. | Jan. 9, 1951 |
| 2,629,133 | Morningstar et al. | Feb. 24, 1953 |

OTHER REFERENCES

Perry: "Chem. Eng. Handbook," 3rd ed., McGraw-Hill, page 1024, 1950.